Patented June 24, 1941

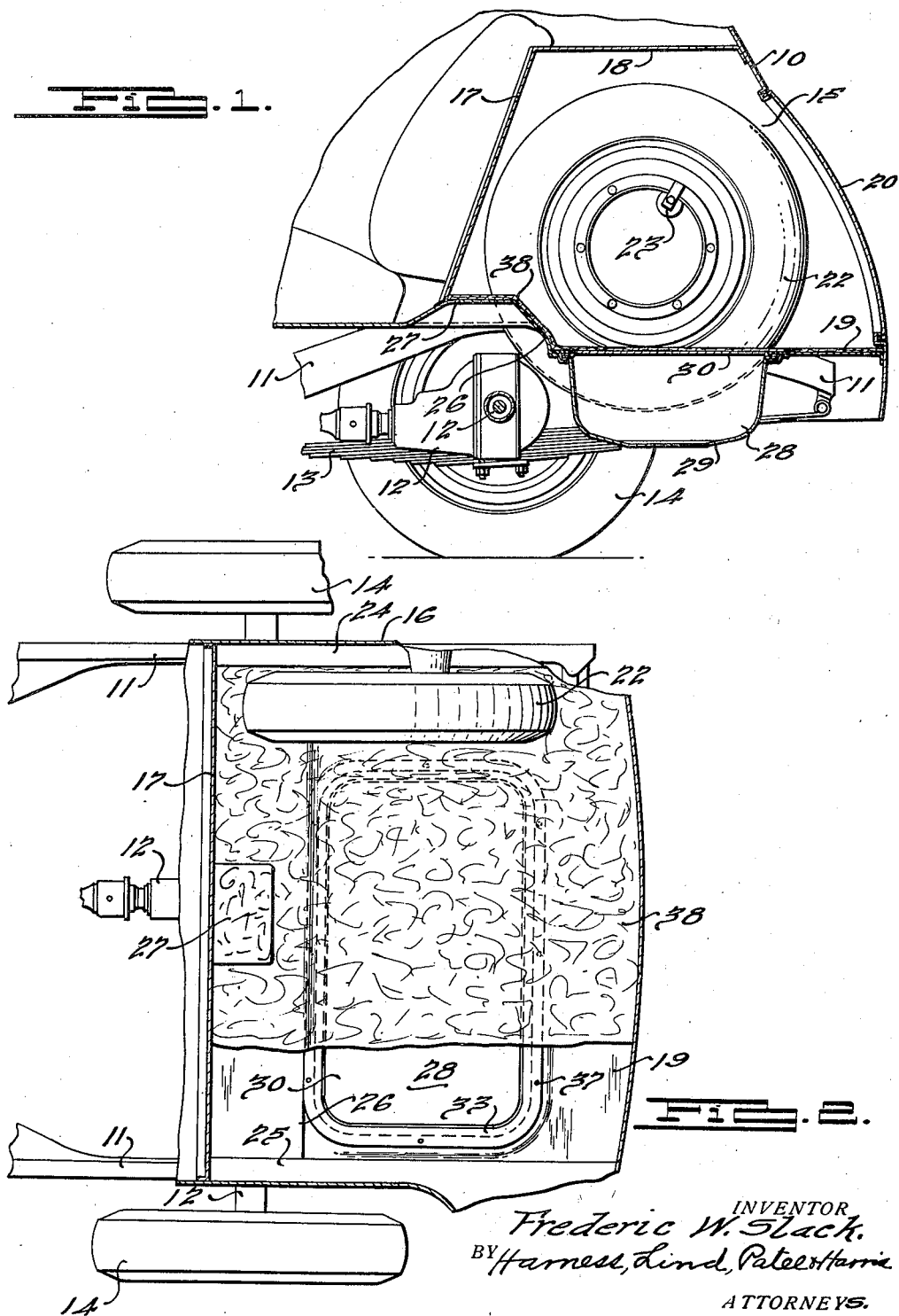

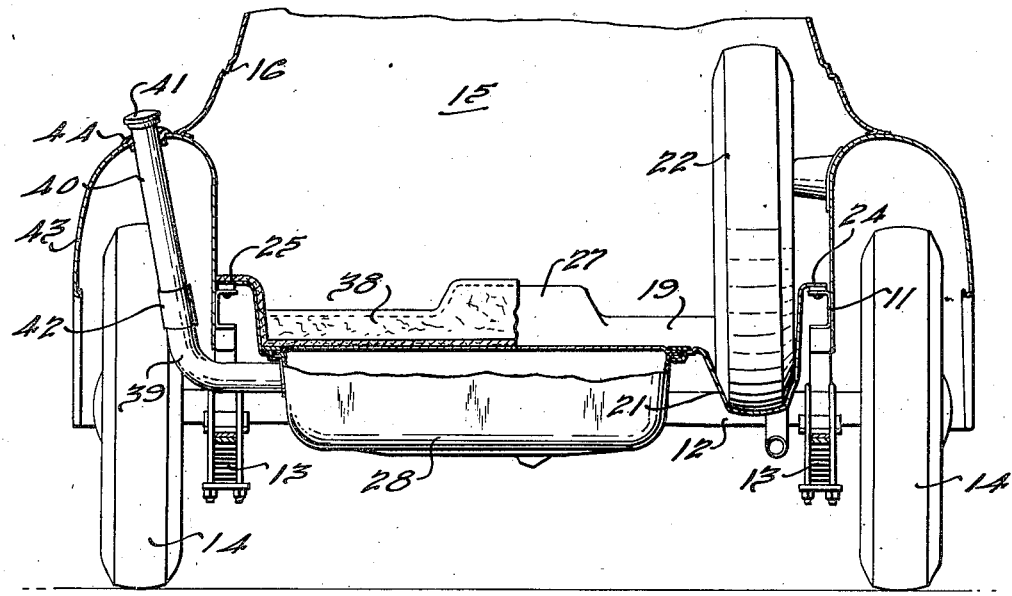

2,246,861

UNITED STATES PATENT OFFICE 2,246,861

BODY CONSTRUCTION

Frederic W. Slack, Detroit, Mich., assignor to Chrysler Corporation, Highland Park, Mich., a corporation of Delaware Application April 27, 1939, Serial No. 270,270

6 Claims. (Cl. 296—37)

This invention relates to body construction for automotive vehicles.

It relates particularly to an improved construction for the rear luggage carrying compartment and fuel tank.

The principal object of the invention is to provide a stronger, more economical and more compact construction for the vehicle fuel tank and spare tire supporting means whereby the luggage carrying capacity of the vehicle is increased and the cost of construction lowered.

Other objects will be apparent from the following description.

In the drawings:

Fig. 1 is a sectional elevational view of the rear luggage compartment of a vehicle.

Fig. 2 is a plan view of the compartment with parts broken away to show the construction thereof.

Fig. 3 is a rear elevation of the same with parts broken away to show details of construction.

Fig. 4 is a detail sectional view of the fuel tank showing the fastening means which secures the tank to the body; and Fig. 5 is a modification of Fig. 4.

Referring to the drawings in which like reference numerals designate corresponding parts referred to in the following description, 10 designates generally a body which is supported on the chassis side sills 11 and secured thereto by suitable fastening means. The chassis sills are in turn supported on the rear driving axle 12 through the springs 13 as is conventional in the art. A pair of road wheels 14 are secured to each end of the axle.

The luggage carrying compartment is referred to generally by the numeral 15 and is enclosed by the body side walls 16, the rear seat back cushion support 17, the rear body shelf 18 and the floor 19. A hinged panel 20 gives access to the compartment from the rear of the vehicle.

The floor panel 19 has a downwardly dished trough-like portion 21 at one side thereof adapted to receive the spare tire 22 which is retained in place by a suitable clamp 23. The panel 19 also has attaching flanges 24 and 25 at the side thereof which follow the contour of the side sills 11 as indicated in Figs. 2 and 3. At the front, panel 19 is provided with a kicked-up portion 26 over the axle and a "bump" 27 to accommodate movement of the differential housing due to road irregularities.

The fuel tank 28 is asymmetrically positioned with respect to the longitudinal central axis of the vehicle as illustrated in Figs. 2 and 3, and consists of a dished portion 29 and a cover 30. The latter has a marginal flange 31 (see Fig. 4) which is adapted to be welded to a mating flange 32 provided on the dished portion 29. The tank cover portion 30 forms part of the floor of the luggage compartment and for this reason the marginal flange 31 is offset slightly downwardly so that the retaining member 33 will be flush with the floor as shown in Fig. 4. The floor panel 19 is offset downwardly around the tank opening as indicated at 34 and 35 to receive the fastening or retaining member 33 and the lip formed by the flanges 31 and 32. An insulating gasket 36 is provided between the lip and the lower ledge 35. The retaining member 33 comprises a continuous sheet metal washer which extends entirely around the tank and is riveted to the ledge portion 34 of the floor 19 by a plurality of rivets 37. A floor mat 38 of the usual type entirely covers the floor portion of the compartment and conceals the tank retaining means from view.

Because of the asymmetric position of the tank 28 with respect to the central axis of the vehicle, the unequal distribution of weight caused by the position of the spare tire 22 is substantially compensated for. The tank 28 has a filler spout 39 which extends outwardly into registry with the pipe 40 to which it is joined by a resilient connector 42. The pipe 40 extends through a rubber grommet 44 provided in a hole in the fender 43 and has a removable filler cap 41 on its outer end.

The construction described provides an extremely rugged fuel tank mounting which does not require any straps or frame cross members such as are commonly provided. Furthermore, the tank itself is simpler and more economical to manufacture than the more-or-less conventional tank which has complementary dished portions welded together along a central joint; and the utilization of the top of the tank as part of the floor permits a more compact construction as well as a considerable saving of metal. By disposing the filler pipe outside of the body of the vehicle the possibility of fumes due to leakage entering the passenger compartment is avoided.

Fig. 5 illustrates a modification wherein the tank 29 is attached to the recessed flange portion 45 of the floor 19 by a relatively narrow retaining member 46. A flexible insulating gasket 48 is provided between the floor flange 45 and the lip of the tank.

It is obvious that other methods of fastening the tank in place may be resorted to without departing from the teaching of my invention.

Having thus described my invention, that which I claim as new and desire to secure by Letters Patent is:

1. In a fuel tank construction for vehicles and the like a dished bottom member having an outwardly turned marginal flange around its upper edge and a substantially flat top member having a downwardly offset marginal flange around its edge, said flanges being welded together to form a closed tank having an outwardly extending downwardly offset, marginal flange around the top thereof; a floor panel having an opening to receive said tank and a downwardly offset marginal ledge portion surrounding said opening; said flange adapted to seat on said ledge; and means for fastening said tank to said floor disposed in the channel formed by said downwardly offset flange and ledge respectively.

2. In a fuel tank construction for vehicles and the like, a dished bottom member having an outwardly turned marginal flange around its upper edge and a substantially flat top member having a downwardly offset marginal flange around its edge, said flanges being welded together to form a closed tank having an outwardly extending downwardly offset, marginal flange around the top thereof; a floor panel having an opening to receive said tank and a downwardly offset marginal ledge portion surrounding said opening; said flange adapted to seat on said ledge; and means securing said tank to said floor comprising a washer overlying said flange and the adjacent portion of said floor and fastened to said floor.

3. The construction set forth in claim 2 in which the floor panel has a depressed portion adapted to receive said washer whereby said tank washer and floor are disposed in flush relation.

4. In a fuel tank construction for vehicles and the like, a dished bottom member having an outwardly turned marginal flange around its upper edge and a substantially flat top member having a downwardly offset marginal flange around its edge, said flanges being welded together to form a closed tank having an outwardly extending, downwardly offset, marginal flange around the top thereof; a floor panel having an opening to receive said tank and a downwardly offset marginal ledge portion surrounding said opening; said flange adapted to seat on said ledge; and means securing said flange to said ledge, said securing means being disposed in the channel formed by said offset flange and ledge respectively whereby a smooth flat floor is obtained.

5. In a vehicle body having a passenger compartment and a storage compartment adjacent said passenger compartment; a floor for said storage compartment comprising a substantially flat panel having a dished portion at one side thereof adapted to receive a spare tire and a cut-out portion adjacent said dished portion adapted to receive a fuel tank disposed therein in flush relationship, said cut-out portion being asymmetrically disposed relative to the longitudinal vertical plane of the body whereby a substantially flat floor is provided for said storage compartment.

6. In a vehicle body having side walls and a floor defining a body compartment, a floor for said compartment comprising a floor panel having a depressed portion at one side thereof adjacent one of said side walls adapted for receiving a spare tire and a cut-out portion extending from a point adjacent said depressed portion in a transverse direction across said floor and terminating adjacent the opposite side wall, said cut-out portion being adapted to receive a fuel tank arranged asymmetrically with respect to the longitudinal central vertical plane of the body and adapted to balance the weight of the spare tire.

FREDERIC W. SLACK.